May 25, 1943.  D. McL. FROTHINGHAM  2,320,071
APPARATUS FOR EXTRUDING METALS
Filed Nov. 23, 1940   2 Sheets-Sheet 1

INVENTOR.
DONALD McLEOD FROTHINGHAM.
BY Fay, Macklin, Gohrick & Williams
ATTORNEYS.

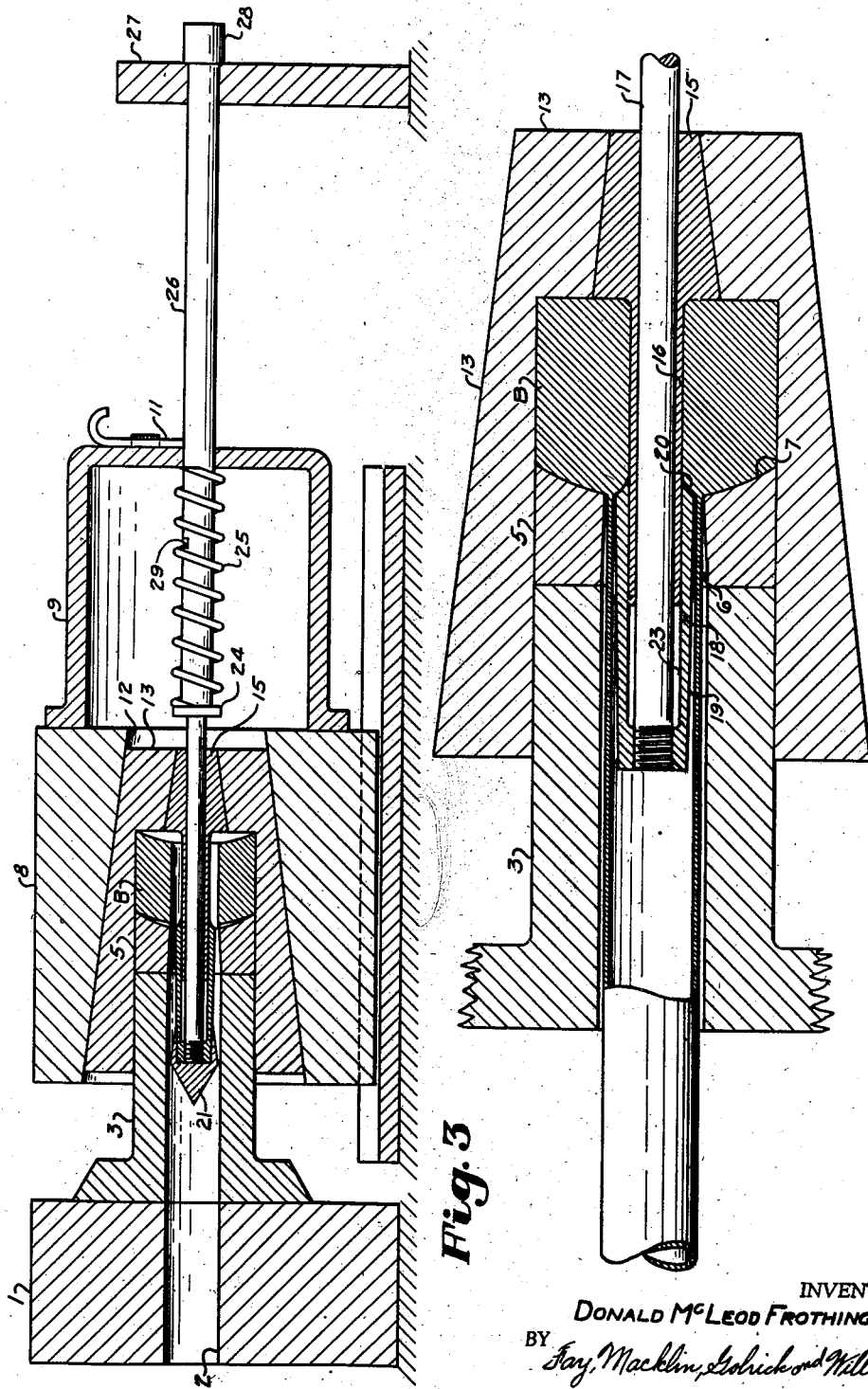

Patented May 25, 1943

2,320,071

UNITED STATES PATENT OFFICE 2,320,071

APPARATUS FOR EXTRUDING METALS

Donald McLeod Frothingham, Noroton, Conn., assignor to Ferrex Corporation, New York, N. Y., a corporation of Delaware Application November 23, 1940, Serial No. 366,858

7 Claims. (Cl. 207—3)

The present invention is directed to the art of extrusion and, more particularly, is directed to the extrusion of hollow objects such as tubing and the like. The extrusion of relatively soft materials such as non-ferrous metals and plastics has been practiced commercially for some time and the processes in use have been employed to extrude hollow shapes. There have been difficulties with these processes however, resulting in inefficiency, excessive die wear and other disadvantages. The extrusion of steel and ferrous materials has been attempted, but has insofar as I am aware always presented apparently unsurmountable difficulties. This has been particularly true in the extrusion of hollow shapes.

In hollow extrusion a piercing mandrel would normally be forced through the plastic slug and the slug then extruded between the die edge and the mandrel. The result was excessive die wear, not only on the die itself, but on the mandrel, due to the abrasive characteristics of the material forming the slug being pushed at greater pressure over the mandrel. This excessive wear on the mandrel not only took place prior to the actual forming operation, but even after the extruded shape had left the die edge and was theoretically completely formed. In the copending application of Harvey M. Gersman, Serial No. 170,395, filed October 22, 1937, there is disclosed an invention for the fabrication of an extruded shape with an over-all efficiency heretofore unattained. I have employed certain features of that invention in the present application to the end that the mandrel itself is provided with an extrusion surface designed to afford the advantages of the above-named application.

The general object of the invention has been to provide a mandrel of improved operating efficiency over those heretofore used. Another object has been to eliminate die wear on the mandrel during the piercing operation and during the extruding operation. Still another object of the invention has been to provide a mandrel with a piercing cap which may be removed during the extrusion operation to provide clearance between the mandrel and the formed extruded tubing. A further object of the invention has been to provide a mandrel formed at the die orifice with a curve possessed of efficient extrusion characteristics to aid the main die face in the formation of the tubing. Other objects of the invention will become apparent from the following description and from the claims hereto.

In general, the invention provides a piercing mandrel carried on a suitable support by which the slug within the die may be pierced prior to the extrusion step. The end of the piercing mandrel is of a diameter enlarged from that of the internal tube diameter and is removable. After the slug has been pierced the removable cap is taken off and as the extrusion proceeds the tube, after leaving the die orifice, will pass over, and out of contact with, a portion of the mandrel of reduced diameter. It is this reduced diameter portion which carries the mandrel piercing point during the piercing operation.

The mandrel is made in several parts and is moved forwardly through the slug until a rear surface thereof is positioned adjacent the main die face. This portion is shaped to provide a true extrusion surface in accordance with the Gersman application above referred to and co-operates with the main die in producing the desired extruded tube.

The mandrel of the present invention is adapted for use in either direct or indirect extrusion and preferably is used in the indirect form of the process. By indirect extrusion is meant the provision of a die orifice in the ram through which the material is forced as the ram and the slug enclosing die are brought together. Under such conditions the extrusion surface is formed in the ram, while in direct extrusion the extrusion surface is formed on the die. With the present invention and indirect extrusion there is no abrasive wear between the mandrel and the slug because these parts are stationary with respect to each other during the extrusion step.

To the accomplishment of the foregoing and related ends, said invention, then, consists of the means hereinafter fully described and particularly pointed out in the claims; the annexed drawing and the following description setting forth in detail certain means and one mode of carrying out the invention, such disclosed means and mode illustrating however, but one of various ways in which the principle of the invention may be used.

In said annexed drawings:

Fig. 3 is a view similar to Fig. 2, but showing the third step in the method; and Fig. 4 is a view, on an enlarged scale, showing the extruding operation proper.

Figure 1:
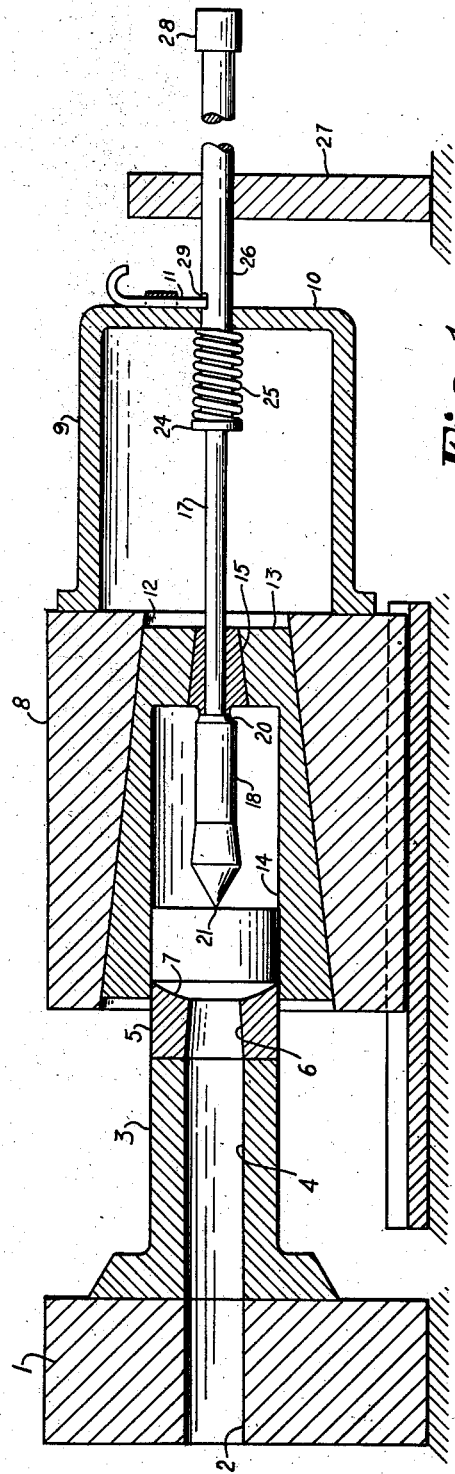
Fig. 1 is a view showing apparatus which may be used in practicing the method of the invention, and illustrating in a more or less diagrammatic manner, the first step in the method.

Referring more particularly to the drawings, the apparatus, as shown in Fig. 1, comprises a stationary base 1 having an opening 2 extending axially therethrough. A stationary ram 3 is mounted on the base and is provided with an opening 4 extending therethrough in axial alignment with the opening 2. A stationary extrusion die 5 is mounted on the ram 3. The die 5 has an opening 6 extending therethrough, the wall of this opening gradually increasing in diameter from one of the openings to the other, so that the diameter of the opening at one end is equal to the diameter of the opening 2 of the base. The ram 5 is provided with an extrusion die surface 7, as shown at the right hand portion in Fig. 1 which is formed in accord with the aforesaid Gersman application. This surface cooperates with a surface on the mandrel hereafter described to form the slug as it approaches the orifice and to shape the tube formed thereby.

The present invention is disclosed in connection with indirect extrusion in which the ram carries the die opening and in which a block is provided with a cylindrical opening in which the slug is received and confined as the block is moved with respect to the ram to shape the slug and force it out of the orifice. To this end there is provided a block 8 mounted for reciprocating movement on a suitable slideway 8ᵃ. Carried by the block is a bell-shaped housing 9 for the purpose hereafter described.

The die block itself is carried within a tapered opening 12 of the block 8 and is generally designated at 13. A cylindrical bore 14 is provided in the die block to receive the die and the ram member 3 as the die and the cylindrical walls of the block 13 cooperate during the extrusion operation.

A mandrel is provided which serves the function of piercing the slug prior to the beginning of the extrusion operation and then cooperates with the die surface 7 to shape the slug as it is extruded through the annular orifice provided between the ram and mandrel. To this end the member 13 is counterbored to receive a mandrel guide 15 which is rigidly secured therein. The guide 15 is provided with a central tubular extension 16, best shown in section in Fig. 4. In the collapsed position of Fig. 1, for instance, the mandrel surrounds the said extension.

To guide the extrusion mandrel there is provided a rod 17 which is slidingly received in a bore of the guide 15 and is spring loaded as hereafter described. The rod is threaded at its unsupported end, shown at the left in Fig. 4, and this threadingly receives a die sleeve 18 of such internal diameter that it closely fits and slides over the exterior of the tubular extension 16. To provide clearance between the sleeve 18 and the extruded tubing, a longitudinal taper 19 is formed on the outside of the sleeve such that the only portion of the sleeve equal to the internal diameter of the extruded pipe or tube is at the die orifice in the position of Fig. 4.

An internal extrusion die surface, indicated at 20, is formed on the end of the sleeve 18 and at one end bounds the interior member of the orifice and at the other end closely engages the exterior sleeve of the tubular extension 16. Thus as material being extruded is compressed between the die and ram interior surface 20 cooperates to shape the same as it approaches the orifice to take the configuration of the tube desired. The die surface 20 is formed in accordance with the teachings of the Gersman application above referred to, to the end that a true external surface may be provided inside of the annular orifice ring as well as on the exterior thereof as previously described in connection with the die surface 7.

To prevent excessive wear on the portion 18 of the mandrel assembly during the piercing operation I provide a pointed cap 21 which may be removably mounted on the threaded end of the sleeve 18 during the piercing operation. This pointed cap has an external diameter somewhat larger than the external diameter of the sleeve 18 adjacent the orifice to insure the piercing of a hole in the billet of sufficient diameter to allow the mandrel to become fully distended as hereafter described. As the ram and die begin to extrude the tubing which is to be formed and the tubing passes through the orifice it will engage the end of the cap 21 and push it off of the supporting sleeve, carrying it outside of the machine and allowing it to be removed. Thus, there will be no portion of the mandrel assembly beyond the orifice which possesses a diameter as great as the internal diameter of the extruded tube, eliminating any abrasive wear which might otherwise occur between the parts. Any wear on the sleeve 18 is eliminated due to the taper heretofore described.

In an inactive position the mandrel may be fully collapsed as shown in Fig. 1 and withdrawn toward the left about the tubular extension 16. To this end the sleeve 18 is enlarged as at 23 to receive the said extension.

During the actual extrusion of material the parts are positioned as shown in Fig. 4 and to insure this position the rod 17 is spring-loaded as above indicated. A collar 24, supporting one end of a coil spring 25, is carried by an enlarged portion 26 of the rod or stem 17. The other end of the spring bears against the bell housing 9 heretofore described to normally urge the mandrel assembly toward the left, as shown in the drawings. A limit to this movement is provided by an end stop 27, through which the enlarged portion 26 passes to be capped at 28 for engagement with the said stop.

In its inactive position prior to the beginning of an extruding operation the mandrel is moved to the position shown in Fig. 1. It is maintained in that position by means of a catch 11 which enters a slot 29 cut in the enlarged rod portion. In this position of the mandrel the spring 25 is under compression and in position to urge the mandrel toward the left as soon as the catch 11 is released.

Figure 2:
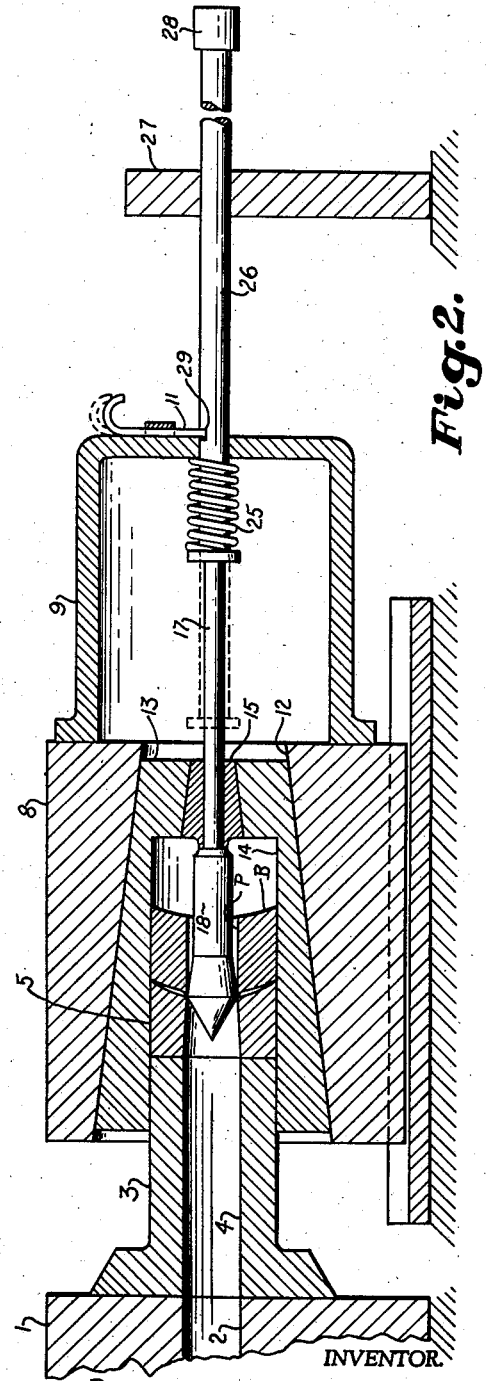
Fig. 2 is a view similar to Fig. 1, but showing the second step in the method.

In operation of the aforedescribed apparatus in practicing the invention, a billet B, which is of a diameter substantially equal to the diameter of the opening 14 in the member 13, is inserted in such opening and positioned so as to engage the piercing point 21. The mandrel is then moved to the position shown in Fig. 2 by movement of the block 8, as a result of which the billet is pierced in the manner clearly shown in Fig. 2, and without any movement of the mandrel relatively to the block 8. At some point in the piercing operation, the catch 11 is released, so that when the piercing is completed, the spring 25 will expand and force the mandrel into the extruding position shown in dotted lines in Fig. 2, this movement of the mandrel being rendered possible by virtue of the fact that the pierced hole P (Fig. 2) in the billet is of greater diameter than the largest diameter of the extruding die. The extruding position of the die 18 is clearly shown in Fig. 3, and is determined by the engagement of the knob 28 of the stem 17 with the stop 27.

At this point in the operation of the mechanism the actual extrusion of the billet in the tubular form of Fig. 4 is about to begin. First, however, the ram and die must telescope with respect to each other until the billet has been shaped to occupy all of the space between the mandrel sleeve 16 and the die walls of the block 13. This reforming of the billet is completed after the right-hand end of the ram-receiving block 13 and the billet have been removed into engagement with each other, as shown in Fig. 3. As aforedescribed, the extruded tube is of slightly less diameter than the largest diameter of the piercing point so that it engages the point and pushes it off of the mandrel and out of the apparatus.

Wear between the tubular stem 16 and the billet is eliminated in indirect extrusion because there is no relative movement of the billet over that portion of the mandrel apparatus. On the contrary, the die surface 20 supported on the sleeve 18 is constantly moving toward the right (Fig. 4) and thus picks the slug material off of the tubular extension and guides it over the surface 20 to the interior extrusion orifice.

The mandrel is returned to its initial position during the extruding operation or, to more correctly express what takes place, the block 8 and the bell member 9 move up to a position where the latch 11 is free to fall into the slot 29. This is because the cap 28 on the end of the stem portion 26 engages the stop 27 and prevents the mandrel from being pushed into the ram opening 4.

Other forms may be employed embodying the features of my invention instead of the one herein explained, change being made as regards the means and the steps herein disclosed, provided the elements stated by any of the following claims or the equivalent of such stated elements be employed, whether produced by my preferred method or by others embodying steps equivalent to those stated in the following claims.

I therefore particularly point out and distinctly claim as my invention:

1. In combination with a ram and die mechanism adapted to cooperate for extrusion of material through an orifice, a mandrel assembly to pierce a slug within the die and condition the same for the extrusion of hollow articles, comprising a tubular extension in alignment with the extrusion orifice, a sleeve embracing said extension in closely fitted sliding relation therewith, a removable piercing point adapted to be positioned at the piercing end of said mandrel assembly and having a cross-sectional area sufficient to pierce a hole of sufficient size to enable said sleeve to slide freely therethrough, and an extrusion die of predetermined surface configuration formed on a portion of said sleeve remote from said piercing end to cooperate with the orifice of said ram and die mechanism to form an extrusion orifice of an internal diameter greater than the external diameter of said tubular extension.

2. In combination with a ram and die mechanism adapted to cooperate for extrusion of material through an orifice, a mandrel assembly to pierce a slug within the die and condition the same for the extrusion of hollow articles, comprising a tubular extension in alignment with the extrusion orifice, a sleeve embracing said extension in closely fitted sliding relation therewith, a piercing point at the piercing end of said mandrel assembly and having a cross-sectional area sufficient to pierce a hole of sufficient size to enable said sleeve to slide therethrough, an extrusion die of predetermined surface configuration formed on a portion of said sleeve remote from said piercing end to cooperate with the orifice of said ram and die mechanism to form an extrusion orifice of an internal diameter greater than the external diameter of said tubular extension.

3. In combination with a ram and die mechanism adapted to cooperate for extrusion of material through an orifice, a mandrel assembly to pierce a slug within the die and condition the same for the extrusion of hollow articles, comprising a tubular extension in alignment with the extrusion orifice, a rod within said extension and slidable therein, a sleeve carried by said rod and embracing said extension in closely fitted sliding relation therewith, a removable piercing point adapted to be positioned at the piercing end of said mandrel assembly and having a cross-sectional area sufficient to pierce a hole of sufficient size to enable said sleeve to slide freely therethrough, resilient means to extend said mandrel assembly in one direction along said tubular extension and latch means to restrain said assembly in the other direction.

4. In combination with a ram and die mechanism adapted to cooperate for extrusion of material through an orifice, a mandrel assembly to pierce a slug within the die and condition the same for the extrusion of hollow articles, comprising a tubular extension in alignment with the extrusion orifice, a rod within said extension and slidable therein, a sleeve carried by said rod and embracing said extension in closely fitted sliding relation therewith, a piercing point at the piercing end of said mandrel assembly and having a cross-sectional area sufficient to pierce a hole of sufficient size to enable said sleeve to slide freely therethrough, an extrusion die of predetermined surface configuration formed on a portion of said sleeve remote from said piercing end to cooperate with the orifice of said ram and die mechanism to form an extrusion orifice of an internal diameter greater than the external diameter of said tubular extension.

5. In combination with a ram and die mechanism adapted to cooperate for extrusion of material through an orifice, a mandrel assembly to pierce a slug within the die and condition the same for the extrusion of hollow articles, comprising a tubular extension in alignment with the extrusion orifice, a rod within said extension and slidable therein, a sleeve carried by said rod and embracing said extension in closely fitted relation therewith, a removable piercing point adapted to be positioned at the piercing end of said mandrel assembly and having a cross-sectional area sufficient to pierce a hole of sufficient size to enable said sleeve to slide freely therethrough, an extrusion die of predetermined surface configuration formed on a portion of said sleeve remote from said piercing end to cooperate with the orifice of said ram and die mechanism to form an extrusion orifice of an internal diameter greater than the external diameter of said tubular extension, resilient means to extend said mandrel assembly in one direction along said tubular extension and latch means to restrain said assembly in the other direction.

6. In apparatus for extrusion, a ram and die adapted to cooperate to extrude material through an orifice bounded by a material forming face, a piercing and forming mandrel shiftably mounted with respect to a slug in the said die to pierce the same and condition the slug for the extrusion of hollow articles, a removable piercing point on said mandrel to effect the piercing operation, said piercing point having a portion of a diameter greater than any external diameter of said mandrel, a material forming die constituting part of said mandrel and means to position said face and said forming die with respect to each other to provide an annular orifice through which to extrude hollow articles.

7. In apparatus for extrusion, a ram and die adapted to cooperate to extrude material through an orifice bounded by a material forming face, a piercing and forming mandrel shiftably mounted with respect to a slug in the said die to pierce the same and condition the slug for the extrusion of hollow articles, a removable piercing point on said mandrel to effect the piercing operation, said piercing point having a portion of a diameter greater than any external diameter of said mandrel, a material forming die at a place remote from said piercing point constituting part of said mandrel and means to position said face and said forming die with respect to each other to provide an annular orifice through which to extrude hollow articles.

DONALD McL. FROTHINGHAM.